(12) United States Patent
Lee (10) Patent No.: US 8,549,950 B2
(45) Date of Patent: Oct. 8, 2013

(54) POWER SUPPLY UNIT FOR ROBOT AND ROBOT HAVING THE SAME

(75) Inventor: Dong Hun Lee, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 873 days.

(21) Appl. No.: 12/656,021

(22) Filed: Jan. 13, 2010

(65) Prior Publication Data
US 2010/0180710 A1   Jul. 22, 2010

(30) Foreign Application Priority Data

Jan. 21, 2009   (KR) .................. 10-2009-0004945

(51) Int. Cl.
*B25J 17/00* (2006.01)
*H02G 5/00* (2006.01)

(52) U.S. Cl.
USPC ....... 74/490.02; 174/70 B; 439/114; 439/115; 901/28

(58) Field of Classification Search
USPC ............... 74/490.02; 439/114, 118, 212, 214, 439/115; 361/648, 649; 174/70 B
See application file for complete search history.

(56) References Cited

U.S. PATENT DOCUMENTS 3,422,387 A * 1/1969 Martin et al. .................. 439/94

FOREIGN PATENT DOCUMENTS

GB   2 067 363   *   7/1981

* cited by examiner

*Primary Examiner* — William C Joyce
(74) *Attorney, Agent, or Firm* — Staas & Halsey LLP (57) ABSTRACT

A power supply unit for robots and a robot having the same. The power supply unit for robots supplies power to actuators installed within an arm, and includes a housing provided with at least two lines of bus bars in an inner reception space; and at least one power unit to branch off power transmitted to the bus bars through power supply lines.

9 Claims, 7 Drawing Sheets

POWER SUPPLY UNIT FOR ROBOT AND ROBOT HAVING THE SAME

CROSS-REFERENCE TO RELATED APPLICATIONS

This application claims the benefit of Korean Patent Application No. 2009-0004945, filed on Jan. 21, 2009, in the Korean Intellectual Property Office, the disclosure of which is incorporated herein by reference.

BACKGROUND

1. Field

Embodiments relate to a power supply unit for robots, which supplies power to actuators driving a joint unit of a robot through a simple structure, and a robot having the power supply unit.

2. Description of the Related Art

Robots of various types, such as a biped robot and a quadruped robot, for domestic, military, and industrial purposes, have been developed.

These robots recognize a current state according to input data from a data input unit including a visual unit, an auditory unit, and a sensory unit, generate instruction data to be carried out according to the recognition result, and thus control actuators provided between joint units respectively connecting a head, a torso, both arms, both legs, etc.

Generally, an actuator moves a joint by amplifying the force of a motor using the motor and a decelerator connected to the motor. In order to perform the same operation as that of a human, a plurality of motors is used and various electric parts including sensors to perform a special function are provided.

The actuator and the various electric parts are electrically connected through several strands of a power cable.

Therefore, in order to supply power to the actuator or the various electric parts requiring the power, power supply lines are disposed at specific positions, and thus a space to install the power supply lines is required and interference of the power cable due to the complicated structure of the power cable is generated. Thereby, the power cable may be damaged.

Particularly, both arms and both legs of a robot are rotated through joint units, and thus the interference of the power cable at the joint units must be addressed.

SUMMARY

Therefore, it is one aspect to provide a power supply unit for robots, which supplies power to a plurality of actuators through a simple structure, and a robot having the same.

It is another aspect to provide a power supply unit for robots, which prevents interference of a power cable at joint units, and a robot having the same Additional aspects will be set forth in part in the description which follows and, in part, will be apparent from the description, or may be learned by practice of the invention.

The foregoing and/or other aspects are achieved by providing a power supply unit for robots, which supplies power to actuators of the robot installed within an arm of the robot, including a plurality of power supply lines, a housing provided with at least two lines of bus bars in an inner reception space, and at least one power unit to branch off power transmitted to the bus bars through power supply lines.

The power supply unit may further include insulators to interrupt the flow of current from the bus bars to the housing.

The insulators may be made of plastic. One surface of the housing may be opened, and the at least one power unit may be plugged in the housing through the opened surface of the housing.

Each of the at least one power units may include an insertion protrusion inserted into the reception space and provided with contact point terminals respectively contacting the bus bars, and a case supported by the upper surface of the housing and provided with power branch lines protruded from the outer surface of the case and connected to the contact point terminals.

Terminal reception parts to receive the contact point terminals may be provided on the insertion protrusion, and springs to elastically support the contact point terminals may be respectively provided in the terminal reception parts.

The arm may include a first arm link and a second arm link relatively rotated around the joint unit, the power supply unit may include a first power supply unit and a second power supply unit respectively provided in the first arm link and the second arm link, and the first power supply unit and the second power supply unit may be electrically interconnected through a connection unit including connection cables connecting the respective bus bars of the first and second power supply units and maintaining a designated tension.

The connection unit may further include sliding members being slidably movable in the housing and elastic members respectively applying pressure to the sliding members, and each of the sliding members may include an insulating part and conductive parts provided at both surfaces of the insulating part to contact the bus bars.

At least one roller contact point part to electrically connect the conductive parts and the bus bars and move the sliding members may be provided at both surfaces of the each of the sliding members.

The foregoing and/or other aspects are also achieved by providing a robot including a joint unit, a first arm link and a second arm link rotated relative to each other around the joint unit, and a plurality of power supply units, respectively provided within the first arm link and the second arm link, each of the power supply units including a housing having an inner reception space, a plurality of bus bars provided in the reception space, and at least one power unit to branch off power supplied to the bus bars.

The power supply units respectively provided within the first arm link and the second arm link may be electrically interconnected through a connection unit.

The connection unit may include sliding members, each of which includes an insulating part and conductive parts respectively provided at both surfaces of the insulating part, connection cables connected to ends of the conductive parts, and elastic members respectively elastically supporting the sliding members to maintain the tension of the connection cables.

At least one roller contact point part to electrically connect the conductive parts and the bus bars and move the sliding members may be provided at one surface of each of the conductive parts.

The at least one power unit may be plugged in the housing through an opened surface of the housing.

Each of the at least one power units may include an insertion protrusion inserted into the reception space and a case supported by the upper surface of the housing, contact point terminals contacting the bus bars and springs to elastically support the contact point terminals may be provided on the insertion protrusion, and power branch lines connected to the contact point terminals may protrude from one side surface of the case.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout.

The embodiments may be applied to robots of various types, but hereinafter, a humanoid robot will be exemplarily described.

Figure 1:
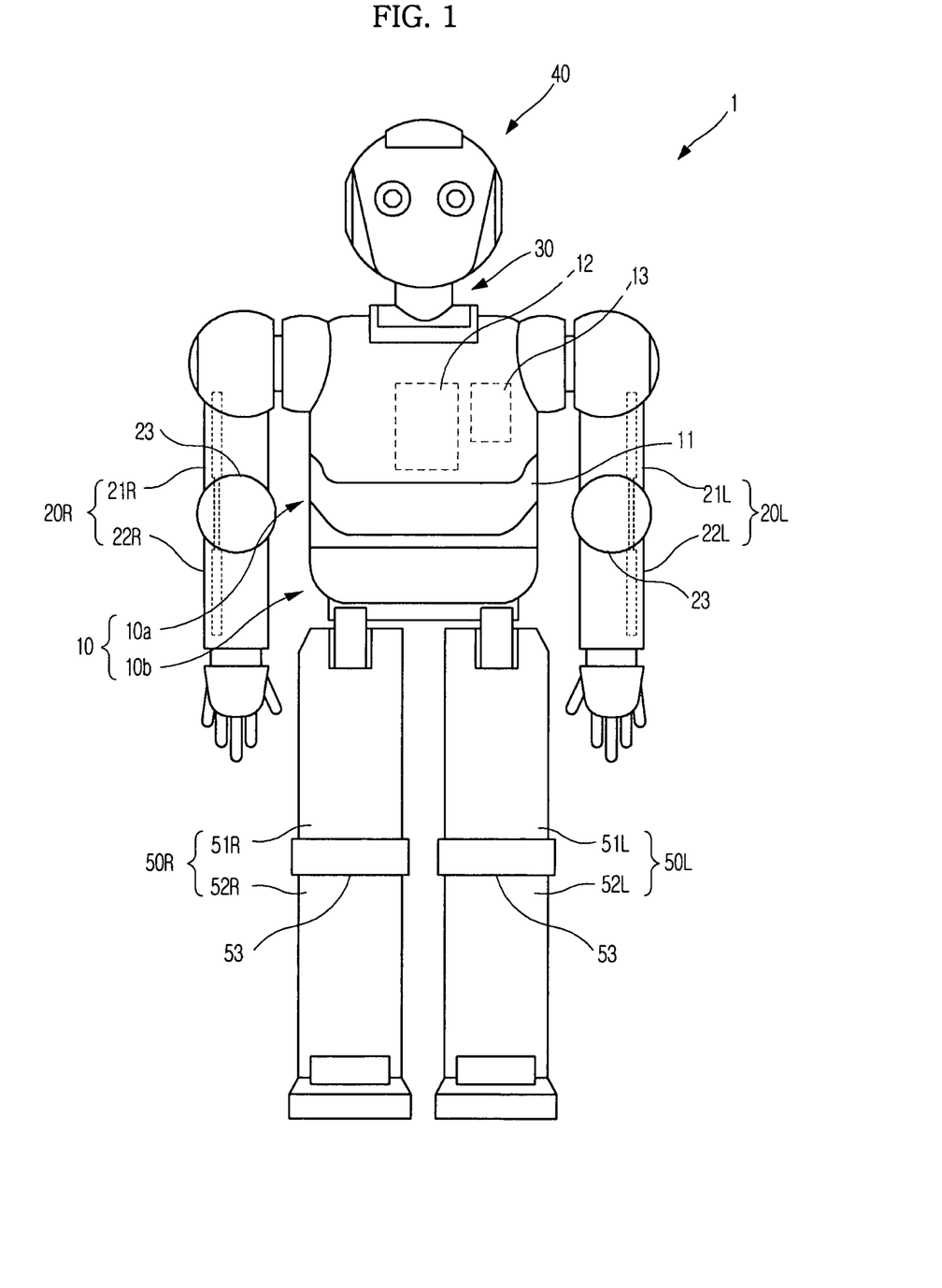
FIG. 1 is a view schematically illustrating the external appearance of a humanoid robot in accordance with an embodiment.

FIG. 1 is a view schematically illustrating the external appearance of a humanoid robot in accordance with an embodiment.

As shown in FIG. 1, a humanoid robot (hereinafter, simply referred to as a 'robot') 1 includes a torso 10, arms 20R and 20L connected to both sides of the upper portion of the torso 10, a head 40 connected to the upper end of the torso 10 through a neck 30, and legs 50R and 50L connected to both sides of the lower portion of the torso 10. Here, R and L respectively represent the right and left sides of the robot 1.

The inside of the torso 10 is protected by a cover 11. A control unit 12, a battery 13, and sensors (not shown) to detect the tilt angle of the torso 10 and the angular velocity thereof are installed in the torso 10.

The torso 10 is divided into a chest part 10a and a waist part 10b. The chest part 10a is rotated relative to the waist part 10b by a joint (not shown) provided between the chest part 10a and the waist part 10b.

Both arms 20R and 20L respectively include upper arm links 21R and 21L and lower arm links 22R and 22L, and the upper arm links 21R and 21L and the lower arm links 22R and 22L are respectively connected by elbow joint units 23.

The elbow joint units 23 respectively include rotary joints (not shown) rotated in the pitch direction and thus have 1 degree of freedom, and achieve the motion of the lower arm links 22R and 22L through the rotary joints (not shown).

Both legs 50R and 50L respectively include upper leg links 51R and 51L and lower leg links 52R and 52L, and the upper leg links 51R and 51L and the lower leg links 52R and 52L are respectively connected by knee joint units 53.

The knee joint units 53 respectively include rotary joints (not shown) rotated in the pitch direction and thus have 1 degree of freedom, and achieve the motion of the lower leg links 52R and 52L through the rotary joints (not shown).

Although the elbow joint units 23 and the knee joint units 53 in accordance with this embodiment have 1 degree of freedom, the elbow joint units 23 and the knee joint units 53 are not limited thereto, but may include rotary joints in the roll or yaw direction according to restrictions or requirements in design.

The overall operation of the robot 1 is generally controlled by a main controller (not shown) including a circuit element, such as a central processing unit (CPU) or a memory, or the control unit 12 including a peripheral circuit (not shown) including an interface to interchange data with the respective elements of the robot 1.

The respective degrees of freedom in the above-described robot 1 are substantially achieved by joint actuators including motors, which are not shown. The joint actuators may be applied to various joints, such as joints of the arms, the legs, and the neck, and in order to achieve a degree of freedom in the directions of at least two axes, such as the roll and yaw directions, at least two joint actuators are combined.

Hereinafter, the application of a power supply unit, which supplies power to electric parts, such as the above joint actuators or sensors, will be described. However, the power supply unit may be applied to a leg having a joint unit.

Figure 2:
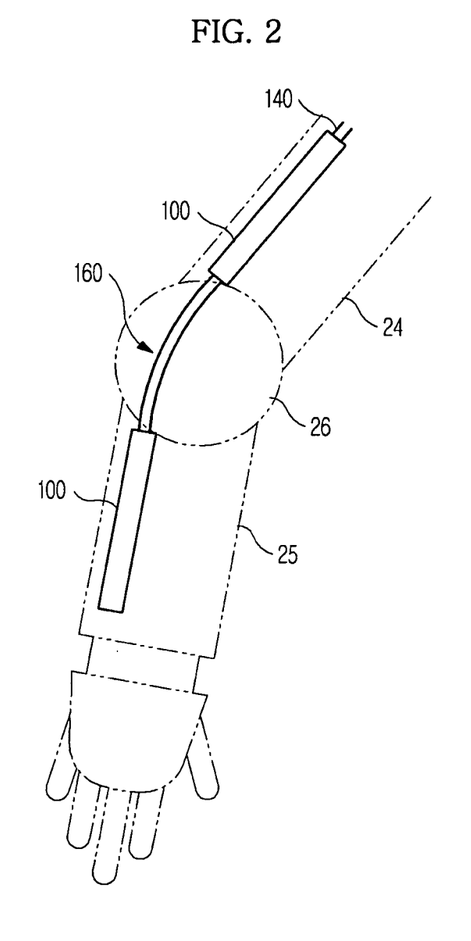
FIG. 2 is a view schematically illustrating power supply units provided in an arm of the humanoid robot in accordance with the embodiment.

FIG. 2 is a view schematically illustrating power supply units provided in an arm of the humanoid robot in accordance with the embodiment. Hereinafter, the upper arm link 20R or 20L will be referred to as a first arm link 24, the lower arm link 21R or 21L will be referred to as a second arm link 25, and the elbow joint unit 23 will be referred to as a joint unit 26. This naming may be equally applied to the upper leg link 51R or 51L, the lower leg link 52R or 52L, and the knee joint unit 53.

As shown in FIG. 2, the first arm link 24 and the second arm link 25 are interconnected through the joint unit 26.

That is, the joint unit 26 is provided at one end of the first arm link 24, and includes a rotary joint, which is not shown.

The rotary joint (not shown) is rotated by an actuator (not shown) including a servo motor (not shown), and the second arm link 25 is rotated relative to the first arm link 24 around the joint unit 26 through the rotary joint (not shown).

A power supply unit 100 to supply power to the actuator (not shown) is provided in each of the first arm link 24 and the second arm link 25, and the power supply units 100 provided in the first arm link 24 and the second arm link 25 are electrically interconnected through a connection unit 160.

The above power supply unit 100 uses bus bars for power distribution, which distribute power and supply the distributed portions of the power, and will be described with reference to FIGS. 3 and 4.

Figure 3:
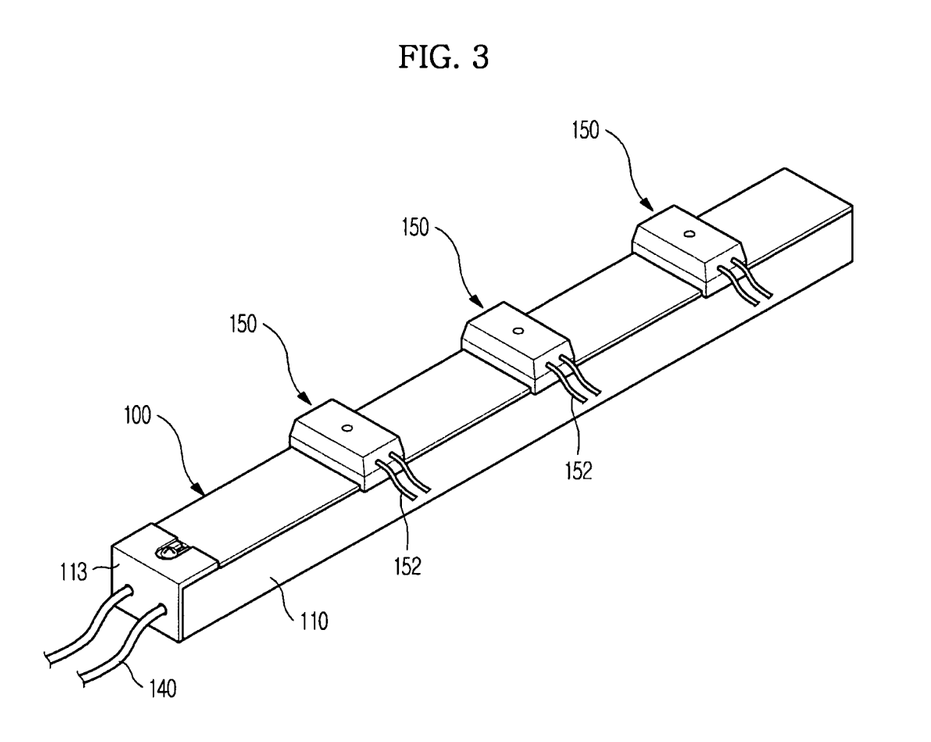
FIG. 3 is a perspective view illustrating the external appearance of one power supply unit of FIG. 2.
Figure 4:
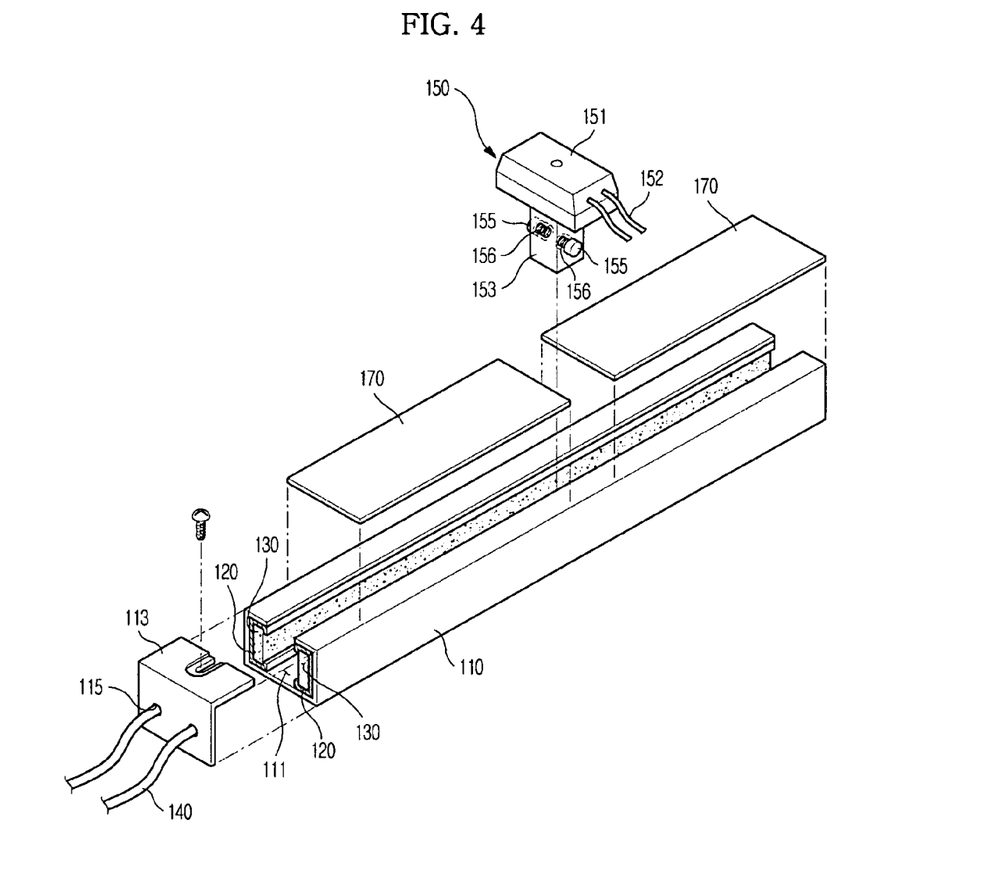
FIG. 4 is an exploded perspective view of FIG. 3.
Figure 5:
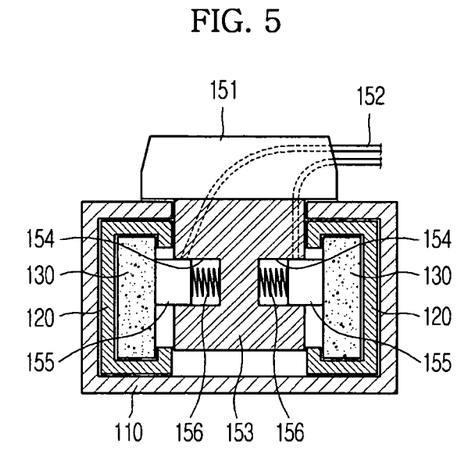
FIG. 5 is a longitudinal-sectional view of the power supply unit in accordance with the embodiment.

FIG. 3 is a perspective view illustrating the power supply unit installed in an arm, FIG. 4 is an exploded perspective view of FIG. 3, and FIG. 5 is a longitudinal-sectional view of FIG. 3.

As shown in FIG. 3, the power supply unit 100 includes a housing 110 provided with bus bars 130 (with reference to FIG. 4) therein, and power units 150 of a plug-in type to branch off power, applied to the bus bars 130 through power supply lines 140, to any place.

Thereby, the power transmitted to the bus bars 130 through the power supply lines 140 is distributed to power branch lines 152 by the power units 150, and is supplied to the actuator (not shown) or the electric parts through the power branch lines 152.

The power units 150 may be provided in plural number according to the number of the actuators or the electric parts requiring power.

With reference to FIG. 4, the housing 110 has a lengthy box shape, one surface of which is opened, provided with a designated reception space 111 formed therein in the longitudinal direction, and the opening surface of the housing 110 is closed with cover members 170.

Insulators 120 are respectively installed at both side walls of the reception space 111 of the housing 110, and the bus bars 130 are respectively inserted into the insulators 120 in the longitudinal direction.

The bus bars 130 are power transmission media made of copper having excellent electrical conductivity, and have a rectangular shape with a square cross section. One end of each of the bus bars 130 is connected to each of the power supply lines 140, which pass through via holes 115 formed through an end cap 113 covering one side surface of the housing 110.

The insulators 120 are made of plastic, such as rubber or PVC, to interrupt the flow of current from the bus bars 130 to the housing 110, and surround the bus bars 130.

Although this embodiment illustrates that the number of lines of the bus bars 130 received in the insulators 120 is two, the number of lines may be two to four to selectively supply necessary power, i.e., power of a single-phase and two-wire type, a three-phase and three-wire type, or a three-phase and four-wire type.

The power units 150 are devices to branch off power from the bus bars 130, and may be provided in plural number, if necessary, such that the power units 150 may be inserted into the housing 110 at random positions through the opening surface of the housing 110 to branch off power.

With reference to FIGS. 4 and 5, each of the power units 150 includes an insertion protrusion 153 inserted into the reception space 111 of the housing 110, and a case 151 supported by the upper surface of the housing 110.

Contact point terminals 155, which respectively contact the bus bars 130 provided in the reception space 111 of the housing 110, are provided on the outer surface of the insertion protrusion 153, and the power branch lines 152, which are respectively connected with the contact point terminals 155, protrude from one side surface of the case 151.

Although this embodiment illustrates that the number of the contact point terminals 155 provided on the insertion protrusion 153 is two, the number of the contact point terminals 155 may be the same as the number of the lines of the bus bars 130.

Terminal reception parts 154, into which springs 156 are respectively inserted, are provided on the insertion protrusion 153, and the contact point terminals 155 are respectively inserted into the insertion protrusion 153 when each of the contact point terminals 155 is supported by one end of each of the springs 156.

When the insertion protrusion 153 of the plug-in power unit 150 are inserted into the housing 110 through the opening surface, the springs 156 apply pressure to the contact point terminals 155 so that the contact point terminals 155 contact the bus bars 130.

Therefore, the power supplied through the power supply lines 140 is transmitted to the bus bars 130, and the power transmitted to the bus bars 130 is stably branched off toward the power branch lines 152 through the contact point terminals 155.

Further, if a plurality of actuators (not shown) to drive the joint unit 26 to achieve a degree of freedom in the directions of at least three axes is provided within the arm links 24 and 25, it is unnecessary to dispose power supply lines to specific positions to supply power to the plurality of actuators, but power may be branched off to random positions of the housing 110 through the power units 150 and thus a structure to supply power may be simplified.

Although this embodiment illustrates that the power units 150 of a plug-in type are inserted into the housing 110 through the opening surface, a plurality of power units 150 fixedly installed on the housing 110 may be provided or power units 150 of a socket type may be fixed to the housing 100.

Hereinafter, a connection unit to electrically connect the power supply unit 100 installed in the first arm link 24 and the power supply unit 100 installed in the second arm link 25 will be described. Hereinafter, the power supply unit 100 installed in the first arm link 24 will be referred to as a first power supply unit 100a, and the power supply unit 100 installed in the second arm link 25 will be referred to as a second power supply unit 100b.

Figure 6:
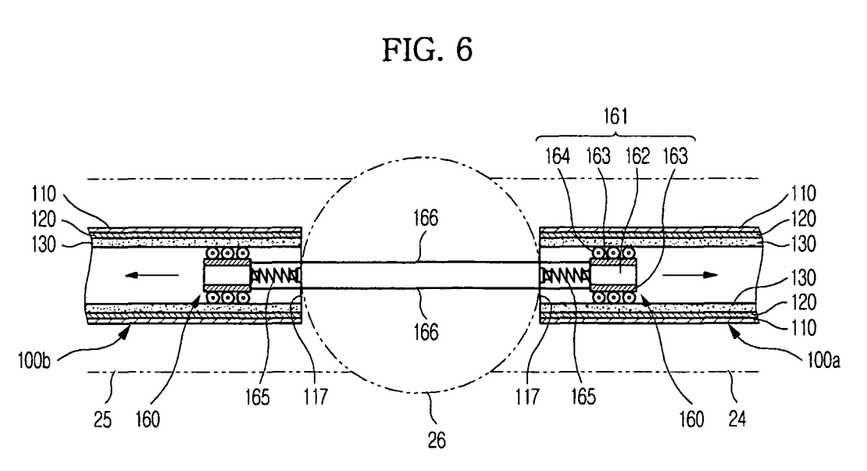
FIG. 6 is a view schematically illustrating a connection unit between the power supply units in accordance with the embodiment.

FIG. 6 is a view schematically illustrating the electrical connection of the first power supply unit 100a and the second power supply unit 100b in accordance with the embodiment.

As shown in FIG. 6, the first and second power supply units 100a and 100b are electrically interconnected through the connection unit 160.

The connection unit 160 includes sliding members 161 contacting the bus bars 130 provided at both side surfaces of the reception space 111 of the housing 110 and slidably moving, elastic member 165 to elastically support the sliding members 161, and connection cables 166 to electrically connect the sliding members 161.

Each of the sliding members 161 has an approximately box shape, and includes an insulating part 162 made of an insulating material and formed at the central position, and conductive parts 163 made of a conductor having excellent electrical conductivity and respectively provided at both side surfaces of the insulating part 162.

At least one roller contact point part 164 to facilitate the electrical connection between each of the conductive parts 163 and each of the bus bars 130 and the smooth movement of each of the sliding members 161 is provided on one surface of each of the conductive parts 163.

The conductive parts 163 and the roller contact point parts 164 may be made of copper (Cu), and the connection cables 166 are connected respectively to ends of the conductive parts 163 respectively provided at both surfaces of the insulating part 162.

Thereby, power transmitted to the respective bus bars 130 of the first power supply unit 100a is transmitted to the conductive parts 163 provided at both surfaces of the sliding member 161 in the second power supply unit 100b through the connection cables 166, and the power transmitted to the conductive parts 163 is transmitted to the bus bars 130 in the second power supply unit 100b through the roller contact point parts 164.

Although this embodiment illustrates the roller contact point parts 164 to facilitate the smooth movement of the sliding members 161, the conductive parts 163 may be in surface contact with the bus bars 130 to facilitate the smooth sliding of the sliding members 161.

The elastic members 165 maintain the tension of the connection cables 166. The elastic members 165 may be made of a compression spring made of rubber or resin, but are not limited thereto. That is, the elastic members 165 may be made of any material, which may apply force in a direction of pulling both ends of the connection cables 166.

One end of the elastic member 165 is supported by the insulating part 162, and the other end of the elastic member 165 is supported by one end 117 of the housing 110, and thus the elastic member 165 applies force in the reverse direction (shown by the arrow) of a direction in which the sliding member 161 moves to the end 117 of the housing 110.

Although this embodiment illustrates that the other end of the elastic member 165 is supported by the end 117 of the housing 110, a separate support member to support the elastic member 165 may be provided in the reception space 111 of the housing 110, or the other end of the elastic member 165 may be pulled by one end of the sliding member 161 using a tension spring.

Thereby, a designated tension is applied to both ends of the connection cables 166 to electrically connect the first power supply unit 100a and the second power supply unit 100b by the elastic force of the elastic members 165.

Figure 7:
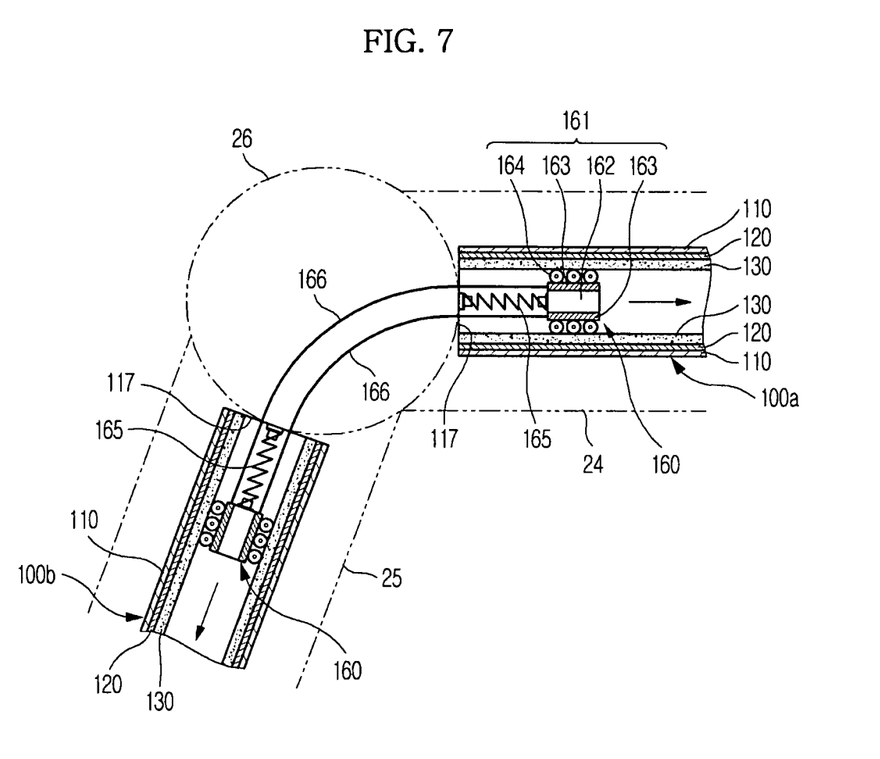
FIG. 7 is a view illustrating the operating state of the connection unit of FIG. 6.

That is, as shown in FIG. 7, when the second arm link 25 is rotated around the joint unit 26, the sliding members 161 move in the direction of the arrow by the elastic force of the elastic members 165. Then, the connection cables 166 provided in the joint unit 26 maintain a designated tension at all times, and thus the twisting of the connection cables 166 due to the loosening of the connection cables 166 is not generated.

Therefore, since the connection cables 166 provided in the joint unit 26 maintain a tight state at all times regardless of the rotation of second arm link 25 around the joint unit 26, it may be possible to prevent the interference of the connection cables 166 with peripheral devices in the joint unit 26 and the breakage of the connection cables 166 due to the twisting of the connection cables 166 in the joint unit.

As is apparent from the above description, the power supply unit for robots and the robot having the same in accordance with an embodiment of the present invention easily supply power to a plurality of actuators through a simple structure, thus not requiring the disposition of separate power supply lines and preventing the breakage of the connection cables in the joint unit due to the interference of the connection cables with peripheral devices.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A power supply unit for robots, which supplies power to actuators of the robot installed within an arm of the robot, comprising:
    a plurality of power supply lines;
    a housing provided with at least two lines of bus bars in an inner reception space; and
    at least one power unit to branch off power transmitted to the bus bars through the power supply lines; and
    at least one connection unit comprising:
        at least one connection cable per bus bar to be electrically connected to its corresponding bus bar and sliding members, wherein the sliding members are slidably movable inside the inner reception space of the housing and wherein the sliding members make electrical contact with the bus bars to electrically connect the respective bus bars to the corresponding connection cables, and wherein the sliding members are biased to maintain a designated tension on the connection cables.

2. The power supply unit according to claim 1, further comprising insulators to interrupt the flow of current from the bus bars to the housing.

3. The power supply unit according to claim 2, wherein the insulators are made of plastic.

4. The power supply unit according to claim 2, wherein one surface of the housing is opened, and the at least one power unit is plugged in the housing through the opened surface of the housing.

5. The power supply unit according to claim 4, wherein the at least one power unit includes an insertion protrusion inserted into the reception space and provided with contact point terminals respectively contacting the bus bars, and a case supported by an upper surface of the housing and comprising power branch lines protruded from an outer surface of the case and connected to the contact point terminals.

6. The power supply unit according to claim 5, further comprising terminal reception parts to receive the contact point terminals, on the insertion protrusion, and springs to elastically support the contact point terminals in the terminal reception parts.

7. The power supply unit according to claim 1, further comprising a joint unit, wherein the arm includes a first arm link and a second arm link relatively rotated around the joint unit, and the power supply unit further includes: a first power supply unit and a second power supply unit respectively provided in the first arm link and the second arm link, wherein the first power supply unit and the second power supply unit are electrically interconnected through the connection unit.

8. A power supply unit for robots, which supplies power to actuators of the robot installed within an arm of the robot, comprising:
    a plurality of power supply lines;
    a housing provided with at least two lines of bus bars in an inner reception space;
    at least one power unit to branch off power transmitted to the bus bars through the power supply lines;
    a joint unit, wherein the arm includes a first arm link and a second arm link relatively rotated around the joint unit, and the power supply unit further includes: a first power supply unit and a second power supply unit respectively provided in the first arm link and the second arm link;
    a connection unit, wherein the first power supply unit and the second power supply unit are electrically interconnected through the connection unit, the connection unit including connection cables connecting the respective bus bars of the first and second power supply units and a biasing member for maintaining a designated tension on the connection cables; and
    sliding members being slidably movable in the housing and elastic members respectively applying pressure to the sliding members, and each of the sliding members includes an insulating part and a plurality of conductive parts provided at respective surfaces of the insulating part to contact the bus bars.

9. The power supply unit according to claim 8, further comprising a plurality of roller contact point parts to electrically connect the conductive parts and the bus bars and move the sliding members, the roller contact point parts being provided at respective surfaces of the each of the sliding members.

* * * * *

UNITED STATES PATENT AND TRADEMARK OFFICE
CERTIFICATE OF CORRECTION

PATENT NO. : 8,549,950 B2
APPLICATION NO. : 12/656021
DATED : October 8, 2013
INVENTOR(S) : Dong Hun Lee Page 1 of 1

It is certified that error appears in the above-identified patent and that said Letters Patent is hereby corrected as shown below:

In the Claims

In Column 7, Line 46, In Claim 1, after "space;" delete "and".

Signed and Sealed this
Eighteenth Day of February, 2014

Michelle K. Lee
*Deputy Director of the United States Patent and Trademark Office*